US008331295B2

(12) United States Patent
Choi et al.

(10) Patent No.: US 8,331,295 B2
(45) Date of Patent: Dec. 11, 2012

(54) BASE STATION AND MOBILE STATION FOR PROCESSING WIRELESS COMMUNICATION WITH EACH OTHER, AND METHOD FOR CONTROLLING THE SAME

(75) Inventors: Hyun Ho Choi, Daejeon (KR); Kyung Hun Jang, Suwon-si (KR); Young Soo Kim, Seoul (KR); Tae In Hyon, Hwaseong-si (KR); In Sun Lee, Seoul (KR); Hyo Sun Hwang, Seoul (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 897 days.

(21) Appl. No.: 12/019,824

(22) Filed: Jan. 25, 2008

(65) Prior Publication Data

US 2009/0059805 A1   Mar. 5, 2009

(30) Foreign Application Priority Data

Aug. 27, 2007  (KR) .................. 10-2007-0086230

(51) Int. Cl.
*H04W 4/00*   (2009.01)
(52) U.S. Cl. ..... 370/329; 370/328; 370/341; 455/452.2; 455/67.11; 455/509
(58) Field of Classification Search .................. 455/63, 455/67.13, 135, 161.3, 277.2, 67.11, 452.2, 455/509; 370/395.21, 328, 329, 441
See application file for complete search history.

(56) References Cited

U.S. PATENT DOCUMENTS

| | | | | |
|---|---|---|---|---|
| 5,603,093 | A * | 2/1997 | Yoshimi et al. | 455/63.1 |
| 5,987,062 | A * | 11/1999 | Engwer et al. | 375/225 |
| 7,231,215 | B2 * | 6/2007 | Lewis et al. | 455/450 |
| 7,352,718 | B1 * | 4/2008 | Perahia et al. | 370/329 |
| 7,428,406 | B2 * | 9/2008 | Raaf | 455/63.4 |
| 2004/0203815 | A1 | 10/2004 | Shoemake et al. | |
| 2006/0064497 | A1 | 3/2006 | Bejerano et al. | |
| 2006/0198338 | A1 * | 9/2006 | Ishii et al. | 370/329 |
| 2006/0198340 | A1 * | 9/2006 | Murata et al. | 370/331 |

FOREIGN PATENT DOCUMENTS

| | | |
|---|---|---|
| JP | 2006-067090 A | 3/2006 |
| KR | 10-1999-0017302 A | 3/1999 |
| KR | 10-2005-0029443 A | 3/2005 |
| KR | 10-2006-0040716 A | 5/2006 |
| KR | 10-2007-0048171 A | 5/2007 |

* cited by examiner

*Primary Examiner* — Jean Gelin
*Assistant Examiner* — Amanuel Lebassi
(74) *Attorney, Agent, or Firm* — NSIP Law

(57) ABSTRACT

A base station and a mobile station for processing wireless communication with each other, and a method for controlling the same are provided. The method for controlling a base station which performs radio communication with a mobile station includes starting radio communication via at least one arbitrary mobile station and a predetermined cellular channel; receiving Channel Quality Indication (CQI) information from the mobile station; determining whether a radio communication anomaly occurs between a specific mobile station from among the at least one arbitrary mobile station and the base station by using the received CQI information; and when determining that the radio communication anomaly occurs with the specific mobile station, controlling to interrupt the radio communication via the predetermined cellular channel and perform radio communication via the specific mobile station and either a shared channel or an open channel.

24 Claims, 7 Drawing Sheets

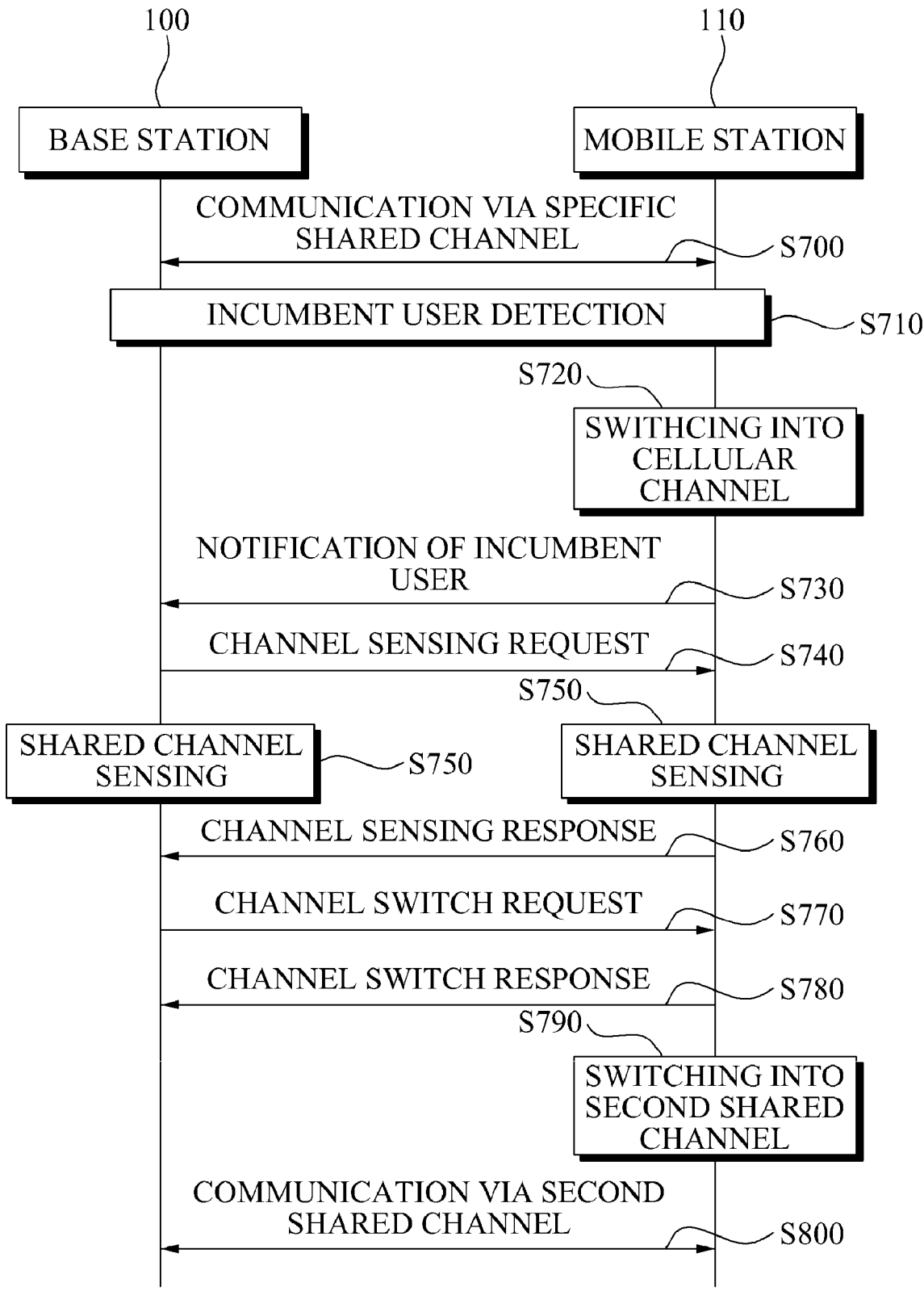

BASE STATION AND MOBILE STATION FOR PROCESSING WIRELESS COMMUNICATION WITH EACH OTHER, AND METHOD FOR CONTROLLING THE SAME

CROSS-REFERENCE TO RELATED APPLICATION

This application claims the benefit of Korean Patent Application No. 10-2007-0086230, filed on Aug. 27, 2007, in the Korean Intellectual Property Office, the disclosure of which is incorporated herein by reference.

BACKGROUND OF THE INVENTION

1. Field of the Invention

The present invention relates to a base station and a mobile station for processing wireless communication with each other, and a method for controlling the same, and more particularly, to a base station and a mobile station for processing wireless communication with each other, and a method for controlling the same which solves problems of an occurrence of a radio communication anomaly.

2. Description of the Related Art

In current radio communication systems, a radio communication anomaly frequently occurs. In general, the radio communication anomaly occurs when a mobile station having a relatively higher data rate occupies channels for a time longer than a time required for a mobile station having relatively lower data rate at the time of transmission of equivalent amount of data. For reference, the mobile station may be referred to as a terminal for convenience of description.

Specifically, when a mobile station having a relatively low data rate due to a bad channel environment is required to transmit a large amount of data, radio communication in another mobile station having a relatively higher data rate is not satisfactorily realized due to an increase in a channel occupancy time. Also, a throughput of a mobile station having a greater overall cell capacity and a higher data rates is significantly reduced.

More specifically, when a first mobile station with a relatively lower data rate due to its bad channel environment is required to transmit its data to a base station, its channel occupancy time is significantly increased in comparison with a second mobile station or a third mobile station having a relatively higher data rates at the time of transmission of equivalent data. Accordingly, the shortage of resources is caused due to a significant increase in the channel occupancy time of the first mobile station, which results in an occurrence of a radio communication anomaly which cannot permit the second mobile station or the third mobile station to transmit data at the same time as the first mobile station. The radio communication anomaly occurs in a downlink where data is transmitted from a base station to a mobile station, as well as in an uplink.

SUMMARY OF THE INVENTION

An aspect of the present invention provides a base station and a mobile station for processing radio communication and a method for the same which prevent a radio communication anomaly from occurring in a radio mobile communication system.

An aspect of the present invention provides a base station and a mobile station for processing radio communication and a method for the same which increase an overall cell capacity and ensure a throughput of a mobile station having a relatively higher data rate while preventing a radio communication anomaly from occurring.

An aspect of the present invention provides a base station and a mobile station for processing radio communication and a method for the same which improve frequency use efficiency of an open channel, and a shared channel which are not in use at that time, by additionally utilizing the open channel and the shared channel.

According to an aspect of the present invention, there is provided a method of controlling a base station which performs radio communication with a mobile station, which includes starting radio communication via at least one arbitrary mobile station and a predetermined cellular channel; receiving Channel Quality Indication (CQI) information from the mobile station; determining whether a radio communication anomaly occurs between a specific mobile station from among the at least one arbitrary mobile station and the base station by using the received CQI information; and when determining that the radio communication anomaly occurs with the specific mobile station, controlling to interrupt the radio communication via the predetermined cellular channel and perform radio communication via the specific mobile station and either a shared channel or an open channel.

According to an aspect of the present invention, there is provided a method of controlling a mobile station which performs radio communication with a base station, which includes starting radio communication via a predetermined base station and a predetermined cellular channel; transmitting CQI information to the base station; when determining whether a radio communication anomaly occurs between the base station and the mobile station by using the CQI information in the base station, receiving, from the base station, information with respect to an occurrence of the radio communication anomaly; and controlling to interrupt the radio communication via the predetermined cellular channel and perform the radio communication via the base station and either a shared channel or an open channel.

According to an aspect of the present invention, there is provided a base station performing radio communication with a mobile station, in which the base station includes a radio communication unit which starts radio communication via at least one arbitrary mobile station and a predetermined cellular channel; a receiving unit which receives CQI information from the mobile station; a determining unit which determines whether a radio communication anomaly occurs between a specific mobile station from among the at least one arbitrary mobile station and the base station by using the received CQI information; and a controlling unit which, when it is determined that a radio communication anomaly occurs with the specific mobile station, controls to interrupt the radio communication via the predetermined cellular channel, and to perform radio communication via the specific mobile station and either a shared channel or an open channel.

According to an aspect of the present invention, there is provided a mobile station performing radio communication with a base station, in which the mobile station includes a radio communication unit which starts radio communication via a predetermined base station and a predetermined cellular channel; a transmitting unit which transmits CQI information to the base station; a receiving unit which receives information with respect to an occurrence of a radio communication anomaly from the base station when determining whether the radio communication anomaly occurs between the base station and the mobile station by using the CQI information in the base station; and a controlling unit which controls to interrupt the radio communication via the predetermined cellular channel and perform the radio communication via the base station and either a shared channel or an open channel.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 7 is a flowchart illustrating another example of a signal flow between a base station and a mobile station performing a radio communication according to an exemplary embodiment of the present invention.

DETAILED DESCRIPTION OF EXEMPLARY EMBODIMENTS

Figure 1:
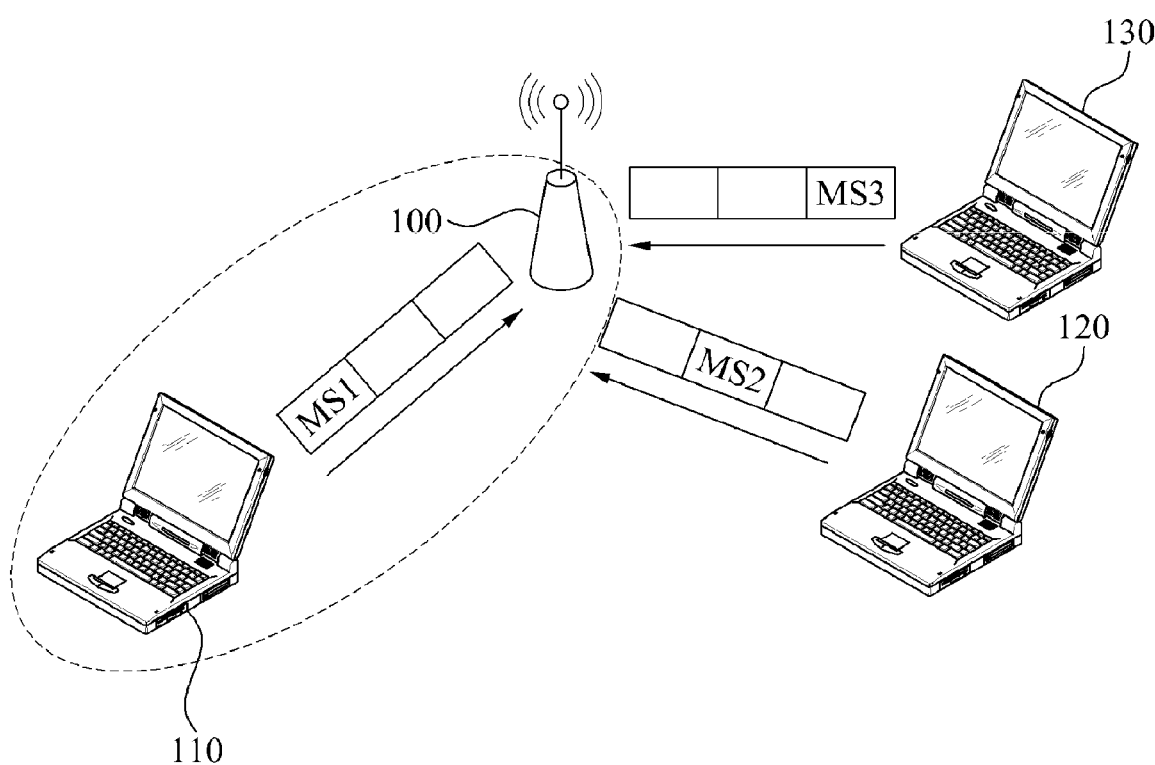
FIG. 1 is a schematic view illustrating a base station and a mobile station performing a radio communication according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a schematic view illustrating a base station and a mobile station performing a radio communication according to an exemplary embodiment of the present invention.

As illustrated in FIG. 1, the base station 100 and mobile stations (a first mobile station 110, a second mobile station 120, and a third mobile station 130), each performing a radio communication, are located in a specific cell. Here, at least one mobile station is located within the cell.

In particular, according to the present exemplary embodiment of the invention, a shared channel or an open channel having a superior channel property are additionally assigned to a first mobile station 110 with a relatively lower data rate where a radio communication anomaly occurs. The shared channel may be an Ultra High Frequency (UHF) television (TV) channel not used by an incumbent user, or a channel used in a Fixed Satellite Service (FSS). The open channel may be an Industrial Scientific Medical (ISM) channel.

In this way, when the shared channel or the open channel is assigned to the first mobile station 110 where the radio communication anomaly occurs according to the present exemplary embodiment of the invention, the second mobile station 120 and the third mobile station 130 each having a relatively higher data rate can realize adequate data transmission.

However, when the base station 100 and the first, second, and third mobile stations 110, 120, and 130 wish to use shared channels and open channels, a spectrum sensing operation is required to be performed to verify the shared channel and the open channel are not used. This spectrum sensing operation is required to be performed in both the base station and the first, second, and third mobile stations 110, 120, and 130. Further, the base station 110 is designed such that a beamforming operation and a Transmit Power Control (TPC) operation are performed in the base station 110 to cognitively and locally use the shared channel and the open channel.

A more specific method for implementing the present invention will be described in detail with reference to FIGS. 2 to 7.

Figure 2:
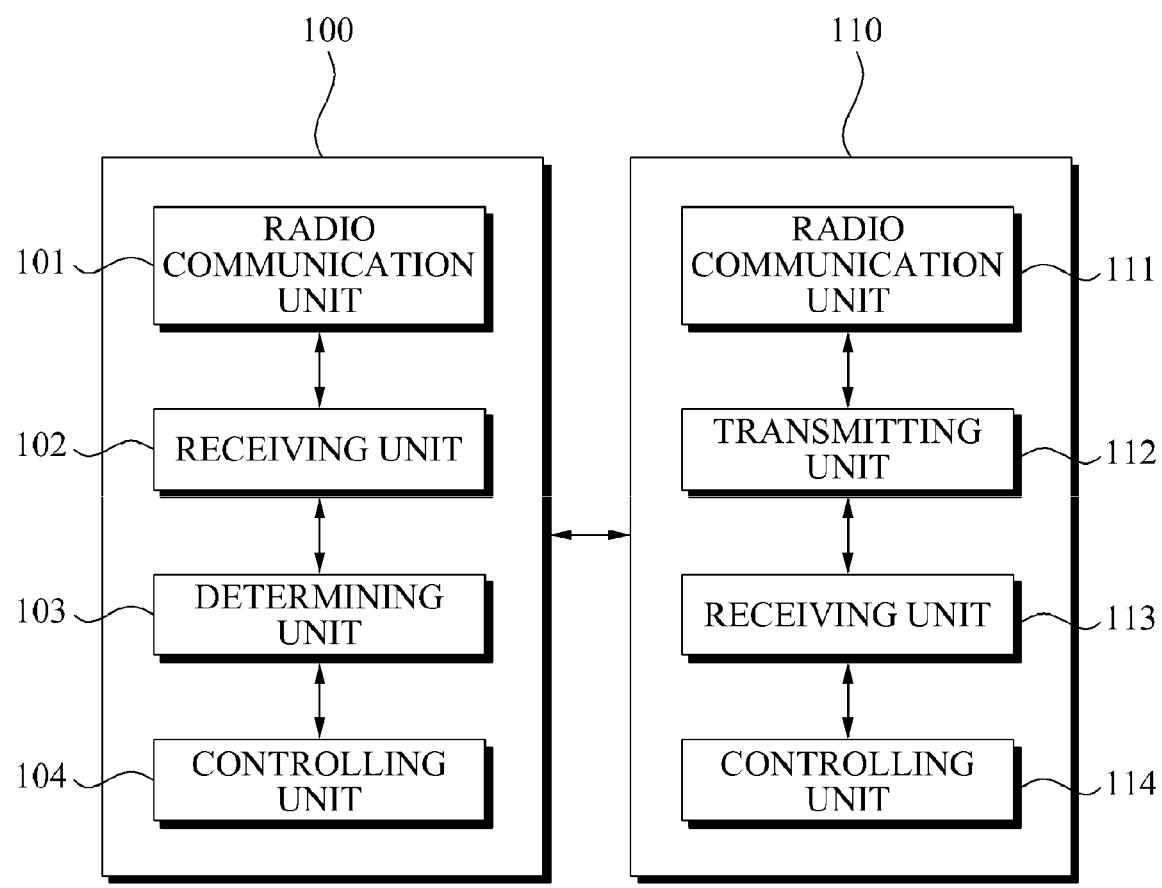
FIG. 2 is a block diagram illustrating an internal configuration of a base station and a mobile station performing a radio communication according to an exemplary embodiment of the present invention.

FIG. 2 is a block diagram illustrating an internal configuration of the base station 100 and the mobile station 110 performing a radio communication according to an exemplary embodiment of the present invention. Hereinafter, the internal configuration of the base station and the mobile station will be described in detail with reference to FIG. 2.

For reference, FIG. 2 mainly illustrates a module directly and indirectly relative to the present exemplary embodiment of the invention. However, blocks illustrated in the present invention can be designed into modules, and the module designates a unit for processing a specific function or operation. Also, the module may be implemented by a hardware or a software or a combination thereof.

As illustrated in FIG. 2, the base station 100 performing a radio communication according to the present exemplary embodiment of the invention includes a radio communication unit 110, a receiving unit 102, a determining unit 103, and a controlling unit 104. The mobile station 110 includes a radio communication unit 111, a transmission unit 112, a receiving unit 113, and a controlling unit 114.

The radio communication unit 101 of the base station 100 performing a radio communication with the mobile station 110 starts radio communication via a predetermined cellular channel and the mobile station 110. Here, only one mobile station is illustrated in FIG. 2, however, at least two mobile stations are used for performing a radio communication with the base station 110, as necessary. The receiving unit 102 receives Channel Quality Indication (CQI) information form the mobile station 110. The CQI information may be Received Signal Strength Indication (RSSI) information, or Signal to Interference plus Noise Ratio (SINR) information.

The determining unit 103 determines whether a radio communication anomaly occurs between the mobile station 110 and the base station 100 using the received CQI information. For example, first, the determining unit 103 determines that a radio communication anomaly occurs with an unspecific mobile station, when a use rate of all channels is greater than a predetermined first constant and when overall throughput is less than a predetermined second constant. Further, the determining unit 103 determines that a radio communication anomaly occurs between the specific mobile station 110 and the base station 100, when a Modulation and Coding Selection (MCS) level of the mobile station 110 is less than a predetermined third constant, when an amount of channel occupant resources determined in response to the MCL level is greater than a predetermined fourth constant, and when an amount of data left in a buffer of the mobile station is greater than a predetermined fifth constant.

For reference, the MCS level designates a level with respect to a modulation and a channel coding combination which are previously specified. As examples for the MCS level, Quadrature Ampliude Modulation (QAM) 256, QAM 64, Quadrature Phase Shift Keying (QPSK), Binary Phase Shift Keying (BPSK), and the like are given. The channel occupant resource designates a channel occupancy time, a channel occupied frequency, and the like, and the constants are changeable depending on desires and experimental results of a designer.

Also, the radio communication unit 111 of the mobile station 110 performing radio communication with the base station 100 starts a radio communication via the base station 100 and a predetermined cellular channel. The receiving unit 113 receives, from the base station 100, information with respect to an occurrence of a radio communication anomaly, when the base station 100 determines whether the radio communication anomaly occurs between the base station 100 and the mobile station 110 using the CQI information. The controlling unit 114 controls to interrupt the radio communication via the predetermined cellular channel, and to perform radio communication via the base station 100 and either a shared channel or an open channel.

For reference, a process for switching an original cellular channel to a shared channel and an open channel upon occurrence of a radio communication anomaly, a process for switching the shared channel and the open channel to the original cellular channel upon disappearance of the radio communication anomaly, and a process for switching a shared channel having been used to another shared channel upon entrance of an incumbent user in the shared channel (for example, UHF TV channel) which is being used, are given, and the detailed descriptions thereof will be described in greater detail below.

Figure 3:
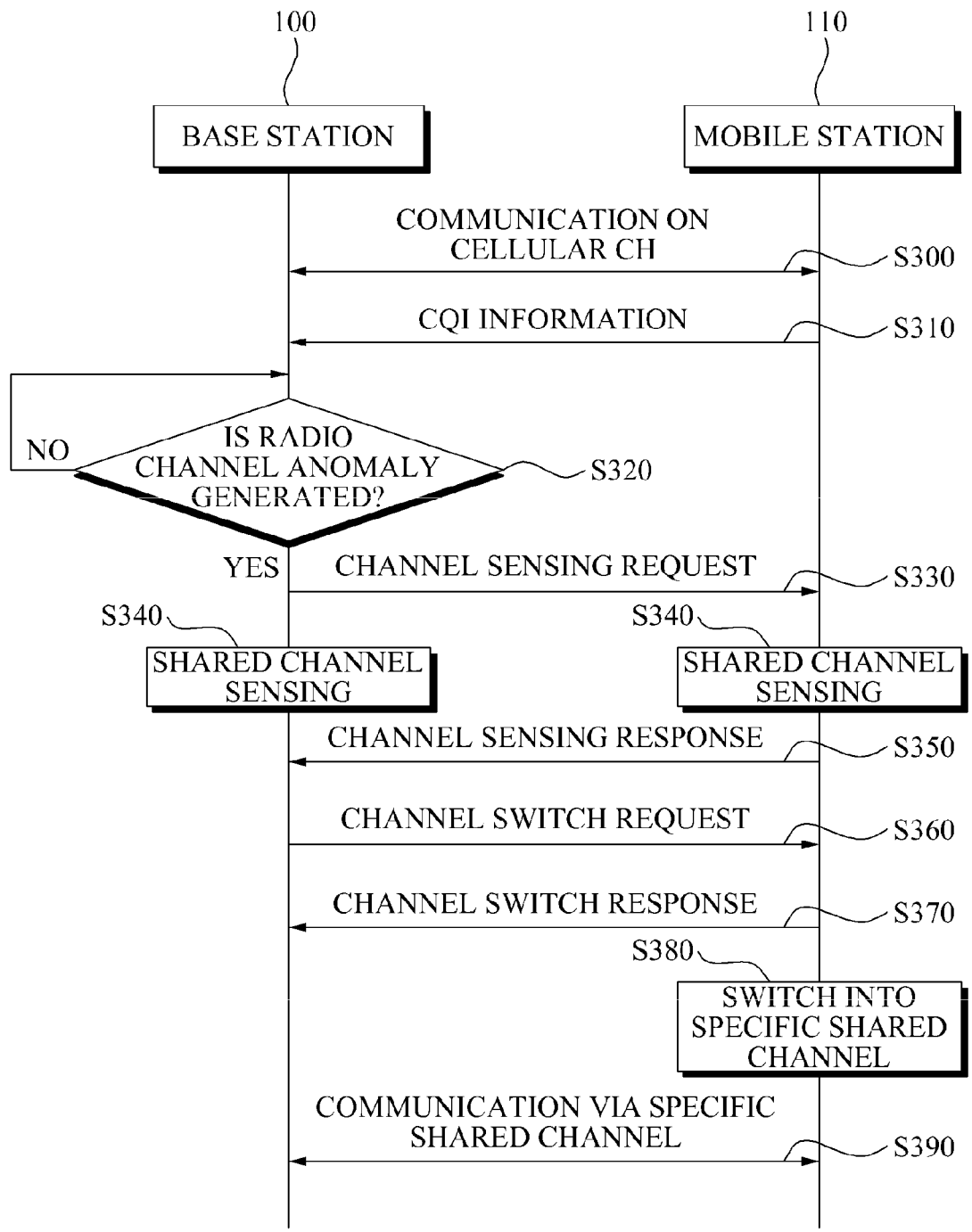
FIG. 3 is a flowchart illustrating an example of a signal flow between a base station and a mobile station performing a radio communication according to an exemplary embodiment of the present invention.

FIG. 3 is a flowchart illustrating an example of a signal flow between the base station 100 and the mobile station 110 performing a radio communication according to an exemplary embodiment of the present invention. Hereinafter, the process for switching an original cellular channel to a shared channel and an open channel upon occurrence of a radio communication anomaly will be described with reference to FIG. 3.

As illustrated in FIG. 3, in operation S300, the base station 100 and the mobile station 110 start radio communication via an initial cellular channel. In operation S310, the mobile station 110 performing radio communication using the base station 100 and the cellular channel periodically transmits CQI information to the base station 100 to verify a state of a downlink. The CQI information may include RSSI information or SINR information. In operation S320, the base station 100 determines a radio communication anomaly is generated when an amount of resources required for data transmission is greater than a predetermined threshold at the time of determining a MCS level of the mobile station according to the CQI information of the mobile station 110. The resources may be time, frequency, or the like. Also, when determining whether the radio communication anomaly occurs, it is required to be determined by considering an amount of resources required for another mobile station. That is, the determination is performed by considering a synthesis of various circumstances in a scheduler of the base station 100. Operation S320 will be described in detailed with reference to FIG. 4.

When it is determined in the base station 110 that the radio communication anomaly occurs, the base station 100 requests the mobile station 110 to perform a channel sensing so as to sense a presently available shared channel, in operation S330. Specifically, the base station 100 assigns a Quiet Period (QP). In operation S340, the mobile station 110 performs a spectrum sensing operation during the QP without data transceiving operations so as to extract an available shared channel. The shared channel may be a UHF TV channel. In operation S340, the base station 100 manages available shared channels sensing shared channels at the assigned QP or all the time by using its separate sensing antenna and Radio Frequency (RF) module.

Figure 4:
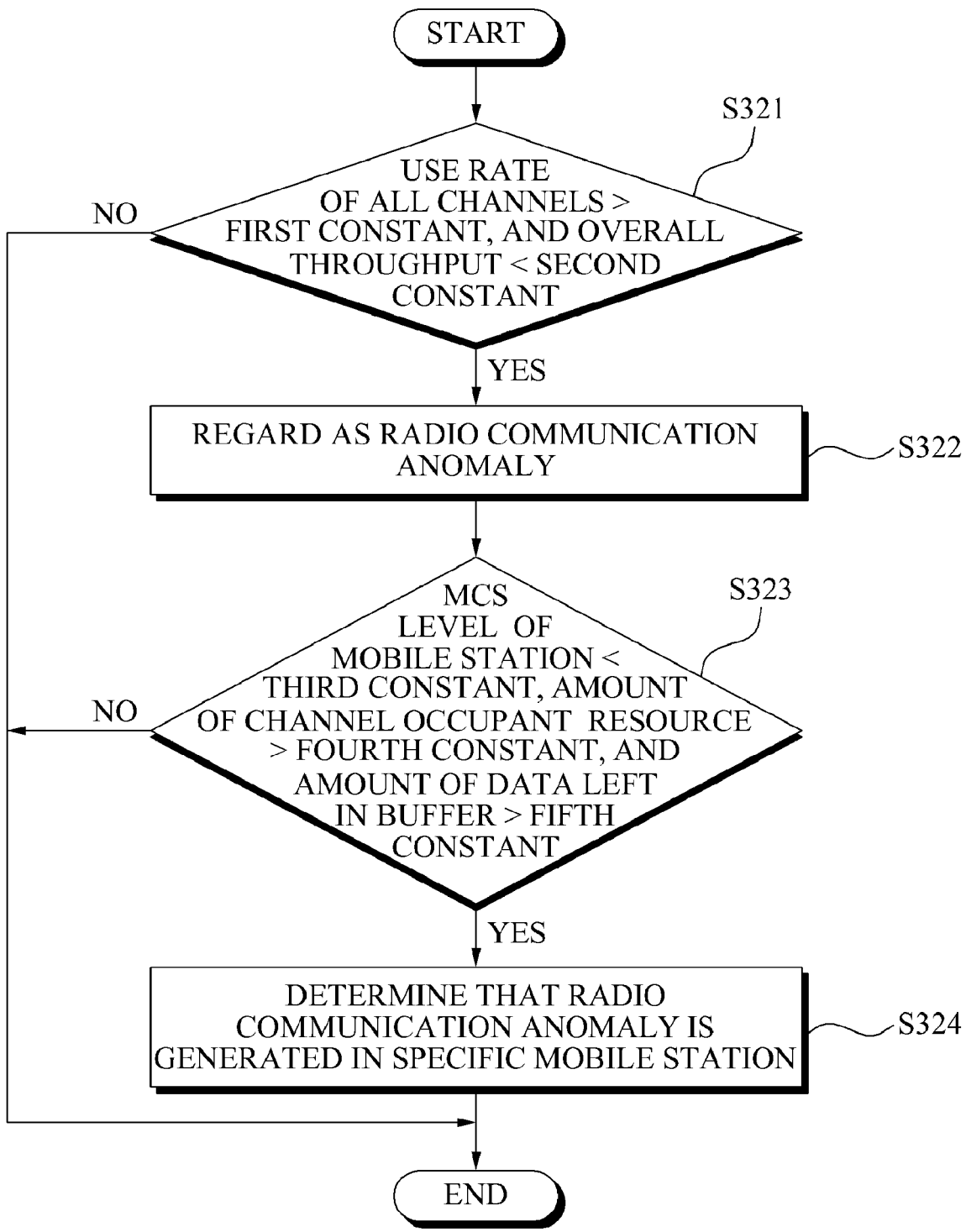
FIG. 4 is a flowchart illustrating an operation of determining that a radio communication anomaly occurs, of FIG. 3, in detail.

After completing the sensing of the shared channel in operation S340, the mobile station 110 transmits, to the base station 100, a channel sensing response message including information with respect to available shared channels in operation S350. In operation S360, the base station 100 transmits, to the mobile station 110 where a radio communication anomaly occurs, information with respect to a specific shared channel intended to be used after verifying available shared channel information, via a channel switch request message. In operation S370, the mobile station 110 which received the channel switch request message responds with a channel switch response message, and in operation S380, the mobile station 110 changes a use frequency to a specific shared channel assigned by the base station 100. From this moment, the mobile station 110 where the radio communication anomaly occurs performs radio communication with the base station 100 using the specific shared channel in operation S390. Obviously, an open channel may be used instead of a shared channel. In this case, operations S330, and S350 may be omitted since there is no need to carry out a separate sensing process. For reference, FIG. 4 illustrates an operation process for determining which specific mobile station a radio communication anomaly occurs with, after determining the radio communication anomaly has occurred.

First, in operation S321, the base station determines whether a use rate of all channels is greater than a first constant and simultaneously a throughput is significantly less than a second constant when calculating the use rate of all channels and the throughput. When the result of the determination of operation S321 satisfies a 'YES' condition, the base station determines the radio communication anomaly occurs, in operation S322. For reference, the calculation of the base station is designed to be performed in the scheduler of the base station.

Further, in operation S323, the base station determines whether the MCS level of the mobile station is less than a third constant, an amount of channel occupant resources (e.g., time, frequency, or etc.) is greater than a fourth constant, and an amount of data left in a buffer, which is required to be transmitted, is greater than a fifth constant. When the result of the determination of operation S323 satisfies a 'YES' condition, the base station determines that a radio communication anomaly is generated with a corresponding mobile station, in operation S324.

Figure 5:
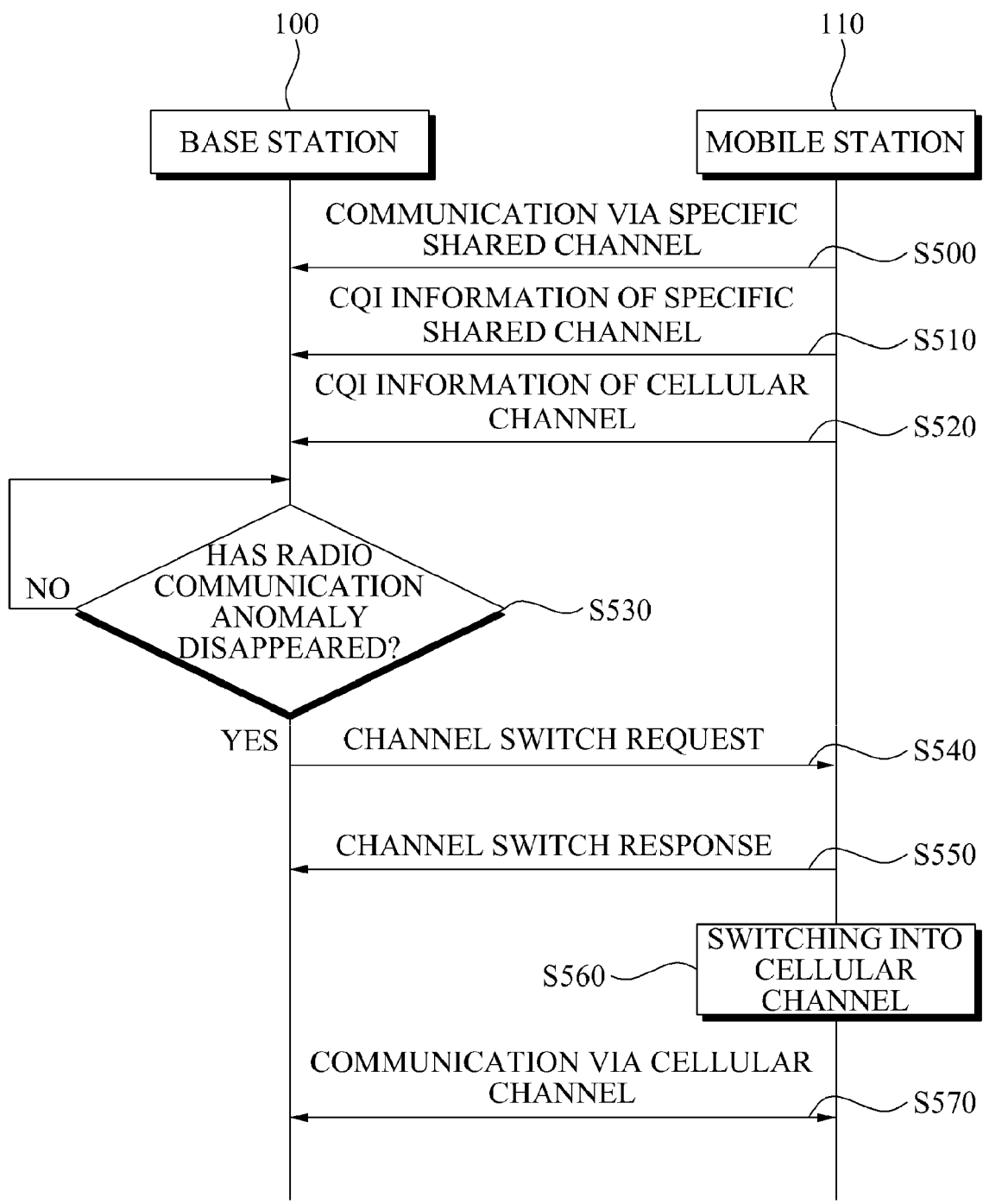
FIG. 5 is a flowchart illustrating another example of a signal flow between a base station and a mobile station performing a radio communication according to an exemplary embodiment of the present invention.

FIG. 5 is a flowchart illustrating another example of a signal flow between the base station 100 and the mobile station 110 performing a radio communication according to an exemplary embodiment of the present invention. Hereinafter, the process for switching the shared channel or the open channel to the original cellular channel upon disappearance of the radio communication anomaly will be described in detail with reference to FIG. 5.

As illustrated in FIG. 5, the base station 100 and the mobile station 110 perform radio communication via a specific shared channel. Obviously, an open channel may be used instead of the shared channel, and the shared channel may be a UHF TV channel.

In operation S510, the mobile station 110 periodically transmits CQI information with respect to the specific shared channel, and in operation S520, it periodically transmits CQI information of a cellular channel. Specifically, the mobile station 110 using a shared frequency periodically verifies broadcast messages and the like periodically transmitted from a cellular channel to measure the CQI and then informs the base station about the measured CQI. This is because it allows the mobile station to determine whether the radio communication anomaly occurs when using the original cellular channel, in the base station.

In operation S530, the base station 100 determines whether a radio communication anomaly disappears with respect to a mobile station where the radio communication anomaly occurs. A more specific description for operation S530 will be given with reference to FIG. 6.

As the determined result of operation S530, when the radio communication anomaly disappears, the base station 100 transmits, to the mobile station 110, a channel switch request message for switching to an original cellular channel so as to switch the specific shared channel to the original cellular channel, in operation S540. In operation S550, the mobile station 110 responses with a channel switch response message, and in operation S560, the mobile station 110 changes a frequency to a cellular channel. Next, in operation 570, the mobile station 110 and the base station 100 perform radio communication via the cellular channel.

Figure 6:
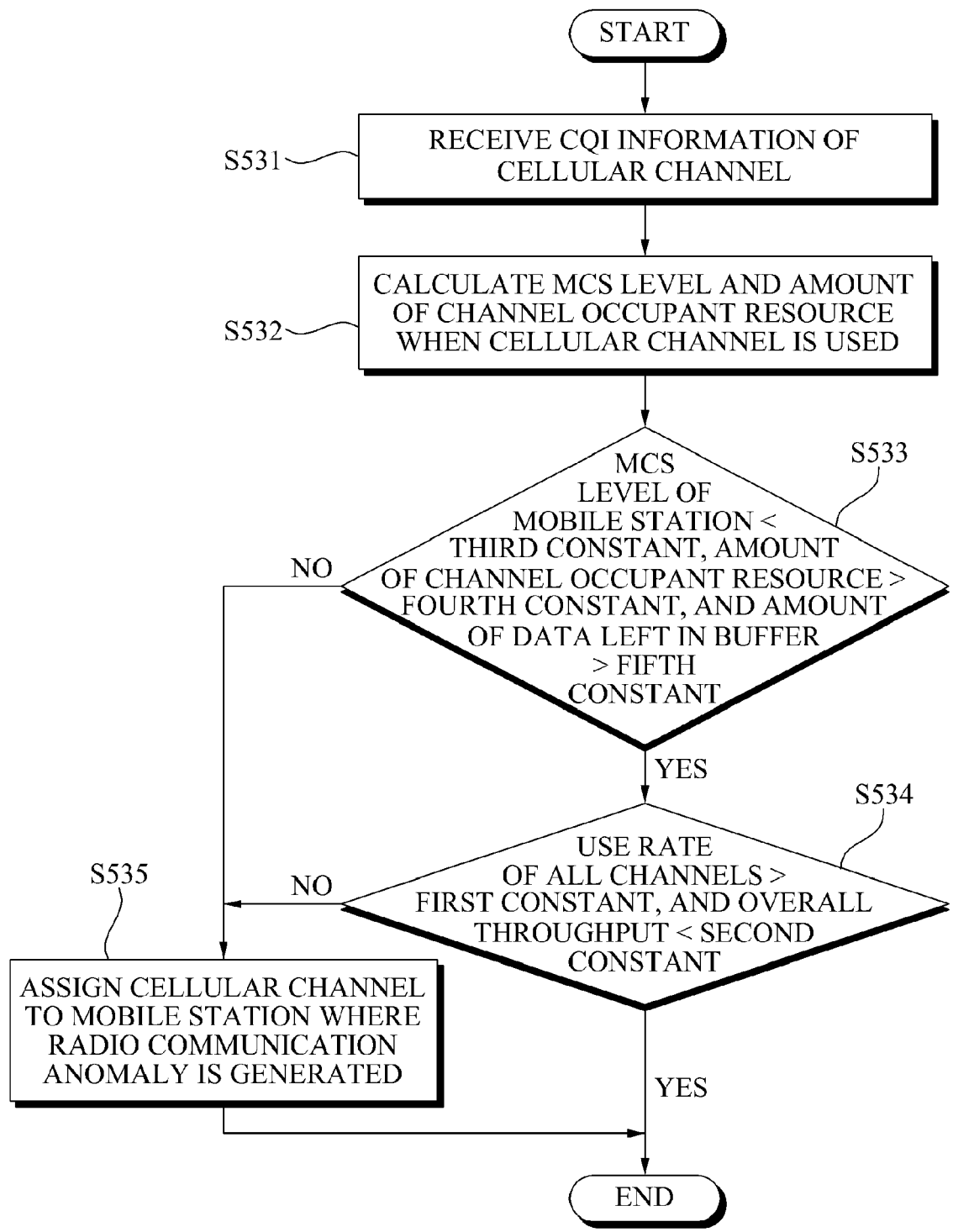
FIG. 6 is a flowchart illustrating an operation of determining that a radio communication anomaly occurs, of FIG. 5, in detail.

FIG. 6 is a flowchart illustrating operation S530 of FIG. 5, in detail. Hereinafter, referring to FIG. 6, operation S530 of FIG. 5 will be discussed in greater detail. For reference, FIG. 6 illustrates that the base station determines whether a radio communication anomaly no longer occurs even when the mobile station with which the radio communication anomaly occurs uses a cellular channel.

In operation S531, the base station receives, from the mobile station, CQI information with respect to the cellular channel, so that the base station determines whether a radio communication anomaly disappears. In operation S532, the base station determines an available MCS level in the case where the mobile station returns to the cellular channel, by using CQI values of the cellular channel. In operation S532, the base station calculates an amount of resources required when the mobile station uses a cellular channel according to the determined MCS level. Based on the calculated values, a process opposite to a process for determining whether the radio communication anomaly occurs as described above is performed, thereby determining whether the radio communication anomaly disappears.

For example, in operation S533, whether the MCS level of the mobile station is less than a third constant, an amount of channel occupant resources is greater than a fourth constant, and an amount of data left in a buffer is greater than a fifth constant are determined. When the result of the determination of operation S533 satisfies a 'NO' condition, a cellular channel is assigned to a mobile station with which a radio communication anomaly is generated in operation S535. This is because it is determined that the radio communication anomaly no longer occurs on the basis of the time of determining.

Conversely, when the result of the determination of operation S535 satisfies a 'YES' condition, whether a use rate of all channels is greater than a first constant, and an overall throughput is less than a second constant are determined in operation S534. When the result of the determination of operation S534 satisfies a 'NO' condition, a cellular channel is assigned to a mobile station with which a radio communication anomaly occurs in operation 535. This is because it is determined that the radio communication anomaly no longer occurs on the basis of the time of determining.

Conversely, when the determined result of operation S534 satisfies a 'YES' condition, a channel switching does not have to be performed since the radio communication anomaly is maintained. The constants of the first to the fifth are constant values determined in the scheduler, as necessary.

When comparing FIG. 4 and FIG. 6, it can be seen that a determining basis with respect to occurrence of the radio communication anomaly is applied relatively more strictly than that with respect to disappearance of the radio communication anomaly. This is because it is to reduce an unnecessary waste of shared/open channels by additionally assigning the shared/open channels only in the case where radio resources are required. Further, when the radio communication anomaly disappears, shared/open channels having been assigned are directly retrieved, and thus, shared/open channels for other mobile stations with which a radio communication anomaly may occur are preliminarily assured.

FIG. 7 is a flowchart illustrating another example of a signal flow between the base station 100 and the mobile station 110 performing radio communication with each other according to an exemplary embodiment of the present invention. Hereinafter, another example of the signal flow between the base station and the mobile station performing radio communication with each other will be described in detail with reference to FIG. 7. For reference, FIG. 7 illustrates a process for switching a shared channel having been used to another shared channel upon entrance of an incumbent user in the shared channel which is being used.

As illustrated in FIG. 7, in operation S700, the base station 100 and the mobile station 110 perform radio communication with each other via a specific shared channel. When it is detected that an incumbent user enters in the specific shared channel in operation S710, the mobile station 110 switches the specific shared channel to the original cellular channel in operation S720 since the mobile station 110 no longer uses the specific shared channel.

However, as more specific methods for performing operation S710 by the mobile station 110, the following two methods will be given. As a first method, it is determined that the incumbent user implicitly enters when the radio communication is not performed via the specific shared channel for a predetermined threshold time period, and then operation S720 is performed. As a second method, it is determined whether an incumbent user enters by periodically and explicitly sensing the incumbent user, and then operation S720 is performed. Obviously, a combination of the first and second methods may be used. In operation S730, the mobile station 110 having switched the specific shared channel to the cellular channel transmits, to the base station 100, information with respect to an entrance of the incumbent. Next, in operation S740, when the base station 100 receives the transmitted information, the base station 100 assigns a QP through a channel sensing request message. In operation S750, the base station 100 and the mobile station 110 perform a sensing operation for shared channels for the QP. Here, the share channel may be a UHF TV channel and the like.

In operation S760, the mobile station 110 verifies available shared channels, and transmits a channel sensing response message to the base station 100 through the verified shared channel. In operation S770, the base station 100 selects another available shared channel, and transmits the selected shared channel via a channel switching request message to the mobile station 110.

In operation S780, when the mobile station 110 receives the channel switching request message, the mobile station 110 responds with a channel switching response message. In operation S790, the mobile station 110 changes a use frequency to another shared channel. Here, the other shared channel refers to a second shared channel.

Accordingly, in operation S800, the mobile station 110 and the base station 100 perform radio communication with each other via the second shared channel. Obviously, when an open channel (e.g., an unlicensed band such as the ISM channel) which is different from the shared channel is used in order to prevent a radio communication anomaly from occurring, an incumbent user does not enter, and thus all operations of FIG. 7 may be omitted.

The method of controlling a base station and a mobile station performing radio communication with each other according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, a radio communication anomaly can be prevented from occurring in a radio mobile communication system.

According to the present invention, an overall cell capacity can be increased, and a throughput of a mobile station having a relatively higher data rate can be ensured.

According to the present invention, frequency use efficiency of an open channel and a shared channel which are not in use at that time can be improved by additionally utilizing the open channel and the shared channel.

In addition, when the UHF TV channel is used as the shared channel while implementing the present invention, the mobile station can rapidly switch from the UHF TV channel having been used to another UHF TV channel even though the incumbent user enters, whereby it does not interfere with existing incumbent users.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling a base station which performs radio communication with a mobile station, the method comprising:
   starting radio communication with a plurality of mobile stations using a predetermined cellular channel;
   receiving Channel Quality Indication (CQI) information from a specific mobile station and at least one other mobile station from among the plurality of mobile stations;
   determining that a radio communication anomaly occurs between the specific mobile station and the base station based on the received CQI information from the specific mobile station and the received CQI information from the at least one other mobile station, the radio communication anomaly comprising the specific mobile station having a throughput rate below a first threshold and a channel occupancy of the predetermined cellular channel above a second threshold;
   in response to determining that the radio communication anomaly occurs with the specific mobile station, controlling to interrupt the radio communication via the predetermined cellular channel and perform radio communication with the specific mobile station using either a shared channel or an open channel; and
   in response to the radio communication being performed with the specific mobile station using the shared channel, the method further comprises assigning, to the specific mobile station, a Quiet Period (QP) for sensing a second available shared channel, receiving, from the specific mobile station, information with respect to at least one available shared channel, and transmitting, to the specific mobile station, a request signal for the controlling to be switched to a specific shared channel from among the at least one available shared channels.

2. The method of claim 1, wherein the CQI information includes at least one of Received Signal Strength Indication (RSSI) information and Signal to Interference plus Noise Ratio (SINR) information.

3. The method of claim 1, wherein the shared channel includes an Ultra High Frequency (UHF) television (TV) channel not used by an incumbent user or a channel used in a Fixed Satellite Service (FSS).

4. The method of claim 1, wherein the open channel includes an Industrial Scientific Medical (ISM) channel.

5. The method of claim 1, wherein, when a use rate of all channels is greater than a predetermined first constant value and an overall throughput is less than a predetermined second constant, the determining determines that the radio communication anomaly occurs.

6. The method of claim 5, wherein, when at least one of a MCS level of the specific mobile station is less than a predetermined third constant, an amount of channel occupant resources determined in response to the MCS level is greater than a predetermined fourth constant, and an amount of data left in a buffer of the specific mobile station is greater than a predetermined fifth constant, the determining determines that the radio communication anomaly occurs between the specific mobile station and the base station.

7. The method of claim 1, further comprising:
   receiving, from the specific mobile station, CQI information of the predetermined cellular channel;
   determining, based on the received CQI information, whether the radio communication anomaly between the specific mobile station and the base station disappears; and
   when the radio communication anomaly disappears, controlling to interrupt the radio communication via the shared channel or the open channel and perform the radio communication with the specific mobile station using the predetermined cellular channel.

8. The method of claim 7, wherein,
when an MCS level of the specific mobile station is greater than a predetermined third constant,
when an amount of a channel occupant resource determined in response to the MCS level is less than a predetermined fourth constant, or when an amount of data left in a buffer of the specific mobile station is less than a predetermined fifth constant, the determining determines that the radio communication anomaly between the specific mobile station and the base station disappears.

9. The method of claim 7, wherein, when a use rate of all channels is less than a predetermined first constant or an overall throughput is greater than a predetermined second constant, the determining determines that the radio communication anomaly disappears between the specific mobile station and the base station.

10. A non transitory computer-readable recording medium storing a program for implementing the method of claim 1.

11. The method of claim 1, wherein the determining further comprises:
   determining that the radio communication anomaly occurs between an unspecific mobile station and the base station based on the received CQI information from the plurality of mobile stations; and
   in response to determining the radio communication anomaly occurs between the unspecific mobile station and the base station, determining the specific mobile station with which the radio communication anomaly occurs based on a Modulation and Coding Scheme (MCS) level of the specific mobile station.

12. A method of controlling a mobile station which performs radio communication with a base station, the method comprising:
   starting radio communication with the base station using a predetermined cellular channel;
   transmitting CQI information to the base station;
   receiving, from the base station, information with respect to an occurrence of a radio communication anomaly that is determined by the base station based on the transmitted CQI information and CQI information transmitted from at least one other mobile station using the predetermined cellular channel, the radio communication anomaly comprising the specific mobile station having a throughput rate below a first threshold and a channel occupancy of the predetermined cellular channel above a second threshold;
   controlling to interrupt the radio communication via the predetermined cellular channel and perform the radio communication with the base station using either a shared channel or an open channel; and
   in response to the radio communication being performed using the shared channel, the method further comprises receiving an assignment of a quiet period (QP) for sensing a second available shared channel, from the base station, transmitting, to the base station, information with respect to at least one available shared channel, and receiving, from the base station, a request signal for controlling to be switched to a specific shared channel from among the at least one available shared channels.

13. The method of claim 12, wherein, when the controlling controls to perform radio communication with the base station using the shared channel, the method further comprises:
   determining whether an incumbent user enters with respect to the shared channel; and
   when the incumbent user enters, controlling to interrupt radio communication via the shared channel and perform radio communication with the base station using the predetermined cellular channel.

14. The method of claim 13, wherein the determining utilizes at least one of either determining that the incumbent user enters when the radio communication fails for a predetermined threshold time period, or determining that the incumbent user enters when the incumbent user is sensed using a periodical signal.

15. The method of claim 12, wherein the CQI information includes at least one of RSSI information and SINR information.

16. The method of claim 12, wherein the shared channel includes a UHF TV channel not used by an incumbent user or a channel used in a FSS.

17. The method of claim 12, wherein the open channel includes an ISM channel.

18. A base station performing radio communication with a mobile station, the base station comprising:
   a radio communication unit which starts radio communication with a plurality of mobile stations using a predetermined cellular channel;
   a receiving unit which receives CQI information from a specific mobile station and at least one other mobile station from among the plurality of mobile stations;
   a determining unit which determines that a radio communication anomaly occurs between the specific mobile station and the base station based on the received CQI information from the specific mobile station and the received CQI information from the at least one other mobile station, the radio communication anomaly comprising the specific mobile station having a throughput rate below a first threshold and a channel occupancy of the predetermined cellular channel above a second threshold; and
   a controlling unit which, in response to determining that the radio communication anomaly occurs with the specific mobile station, controls to interrupt the radio communication via the predetermined cellular channel, and to perform radio communication with the specific mobile station using either a shared channel or an open channel,
   wherein, in response to the radio communication being performed with the specific mobile station using the shared channel, the base station assigns, to the specific mobile station, a Quiet Period (QP) for sensing a second available shared channel, receives, from the specific mobile station, information with respect to at least one available shared channel, and transmits, to the specific mobile station, a request signal for the controlling to be switched to a specific shared channel from among the at least one available shared channels.

19. The base station of claim 18, wherein the CQI information includes at least one of RSSI information and SINR information.

20. The base station of claim 18, wherein the shared channel includes a UHF TV channel not used by an incumbent user or a channel used in an FSS.

21. The base station of claim 18, wherein the open channel includes an ISM channel.

22. The base station of claim 18, wherein, when a use rate of all channels is greater than a predetermined first constant and an overall throughput is less than a predetermined second constant, the determining unit determines that a radio communication anomaly occurs.

23. The base station of claim 22, wherein,
   when an MCS level of the specific mobile station is less than a predetermined third constant,
   when an amount of channel occupant resource determined in response to the MCS level is greater than a predetermined fourth constant, or
   when an amount of data left in a buffer of the specific mobile station is greater than a predetermined fifth constant, the determining unit determines that the radio communication anomaly occurs between the specific mobile station and the base station.

24. A mobile station performing radio communication with a base station, the mobile station comprising:
- a radio communication unit which starts radio communication with the base station using a predetermined cellular channel;
- a transmitting unit which transmits CQI information to the base station;
- a receiving unit which receives, from the base station, information with respect to an occurrence of a radio communication anomaly that is determined by the base station based on the transmitted CQI information and CQI information transmitted from at least one other mobile station using the predetermined cellular channel, the radio communication anomaly comprising the specific mobile station having a throughput rate below a first threshold and a channel occupancy of the predetermined cellular channel above a second threshold; and
- a controlling unit which controls to interrupt the radio communication via the predetermined cellular channel and perform the radio communication with the base station using either a shared channel or an open channel, wherein, in response to the radio communication being performed using the shared channel, the mobile station receives an assignment of a quiet period (QP) for sensing a second available shared channel, from the base station, transmits, to the base station, information with respect to at least one available shared channel, and receives, from the base station, a request signal for controlling to be switched to a specific shared channel from among the at least one available shared channels.

* * * * *